Sept. 28, 1948.  C. P. BERGMAN  2,449,974
ROTARY FLUID METER

Filed Sept. 29, 1944　　　　　　　　　　　　　　　　2 Sheets-Sheet 1

INVENTOR.
CHARLES P. BERGMAN
BY Strauch & Hoffman
Attorneys

Sept. 28, 1948. C. P. BERGMAN 2,449,974
ROTARY FLUID METER
Filed Sept. 29, 1944 2 Sheets-Sheet 2
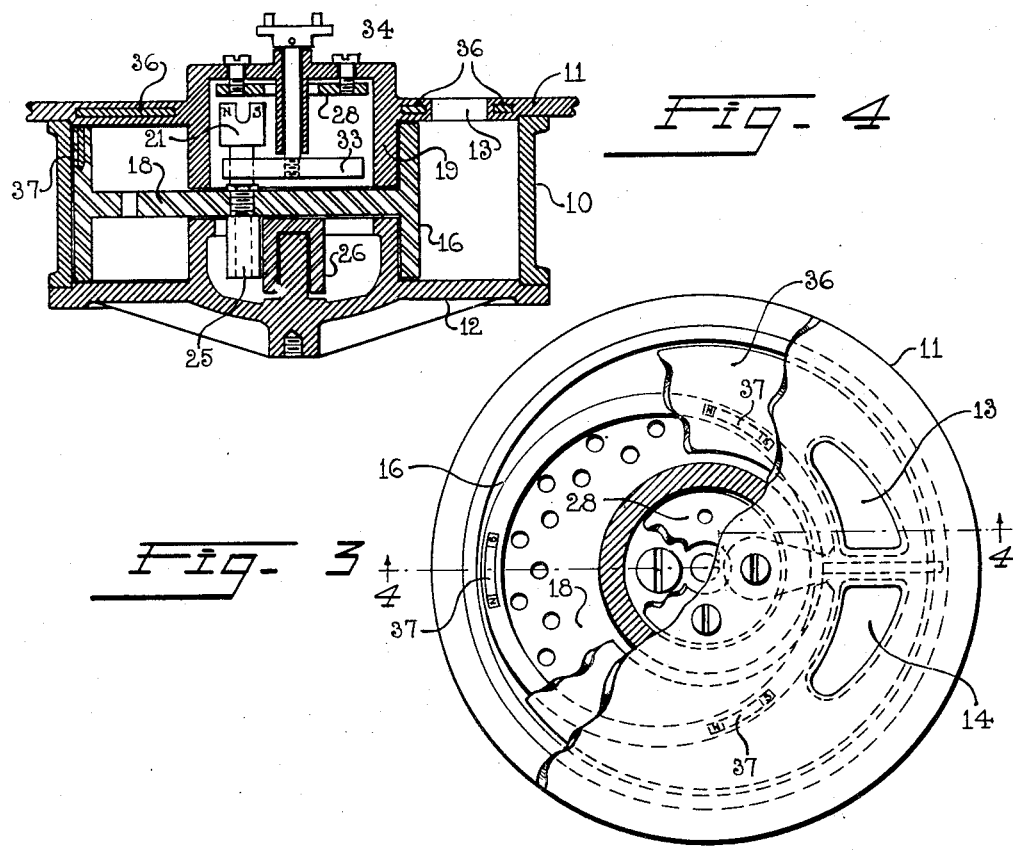
INVENTOR.
CHARLES P. BERGMAN
BY
ATTORNEYS Patented Sept. 28, 1948

2,449,974

UNITED STATES PATENT OFFICE 2,449,974

ROTARY FLUID METER

Charles P. Bergman, Brooklyn, N. Y.; William V. Elliott, administrator of said Charles P. Bergman, deceased, assignor to Rockwell Manufacturing Company, Pittsburgh, Pa., a corporation of Pennsylvania Application September 29, 1944, Serial No. 556,413

4 Claims. (Cl. 121—68)

This invention relates to fluid meters and the like and has particular reference to arrangements for reducing mechanical frictional resistance to movement of a fluid actuated member thereof.

This is a continuation-in-part of my co-pending application, Serial No. 545,237, filed July 17, 1944.

In fluid meters and like devices wherein a register or like operating member is actuated by fluid flow and in which it is important that such member accurately respond to fluid pressure of relatively low force, it is highly desirable to reduce mechanical frictional resistance as much as possible.

In the operation of oscillating piston meters, there is more or less resistance to the free oscillating motion of the piston, due to frictional contact between the piston and the walls of the measuring chamber or other associated relatively fixed parts. This is particularly true in the lower range of fluid pressures, and has a tendency to cause intermittent and non-linearly responsive motion instead of the desired continuous and proportional oscillatory motion of the piston within the measuring chamber. Therefore, since the piston drives a gear train operating a totalizing register, the operation of the register may be erratic and unreliable.

Accordingly, it is a primary object of this invention to provide novel magnetic means whereby mechanical frictional resistance to movement of a fluid actuated member of a meter or the like is reduced to the extent that interference with accurate operation is practically eliminated.

Another object of the invention is to provide novel means wherein gravitational drag upon the movement of a fluid pressure actuated member in a meter or the like is substantially overcome.

Still another object of the invention is to provide novel meter or like structure wherein a fluid actuated member is sustained in a vertically suspended gravitationally countervailed position.

A further object of the invention is to provide novel arrangements for magnetically suspending and sustaining a fluid actuated meter or like member in a position of gravitational equilibrium intermediate its upper and lower limits of vertical displacement.

A still further object of the invention is to provide magnetic means counteracting gravitational drag for sustaining the fluid pressure operative member of a meter or the like in vertical equilibrium in its housing.

It is a further purpose of my present invention to provide simple and effective means for increasing the operating efficiency and accuracy of such fluid meters by substantially eliminating frictional resistance to the oscillatory movement of the meter piston, thereby also assuring the noiseless operation of the meter.

A more particular object of the invention is to provide means controlling the operative position of a fluid actuated meter piston with respect to the walls of the measuring chamber which embodies a stationary member and a movable member fixed to the oscillatory piston, said members being cooperatively associated and acting to sustain the piston substantially in a position of floating equilibrium within the fluid medium throughout the cycle of oscillatory motion.

A more particular object of the invention in one embodiment thereof resides in the provision of a permanent magnet having a fixed connection with the oscillatory piston, substantially at its axial center, and a cooperating adjustable armature whereby the influence of the magnetic forces upon said piston may be accurately controlled to support or suspend said piston for oscillating motion within the measuring chamber for substantially frictionless movement with respect to the chamber walls and other relatively fixed parts.

It is also a further object of my invention to provide a desirable improvement in fluid meters as above characterized in which structural simplicity and low fabrication costs are achieved, combined with durability, freedom from maintenance expense, and maximum efficiency in operation under variable fluid pressures.

With the above and other subordinate objects in view, the invention consists in the improved fluid meter and in the construction and relative arrangement of its several cooperating parts as will hereinafter be more fully described, illustrated in the accompanying drawings and subsequently incorporated in the subjoined claims.

Figure 3 is a top plan view with parts broken away of a further embodiment of the invention wherein a plurality of piston carried magnets are employed; and Figure 4 is a vertical section taken substantially on line 4—4 of Figure 3.

Figure 1:
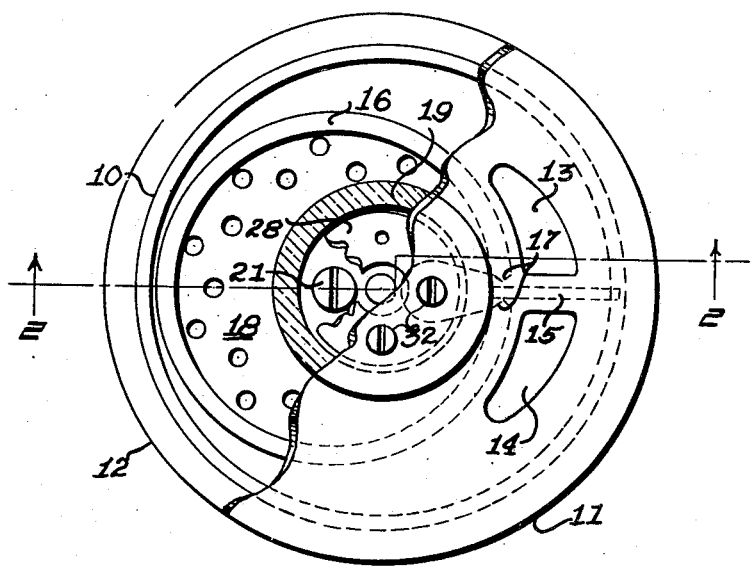
Figure 1 is a top plan view of a preferred embodiment of the present invention as applied to an oscillating piston meter with part of the top broken away to illustrate the piston and measuring chamber.
Figure 2:
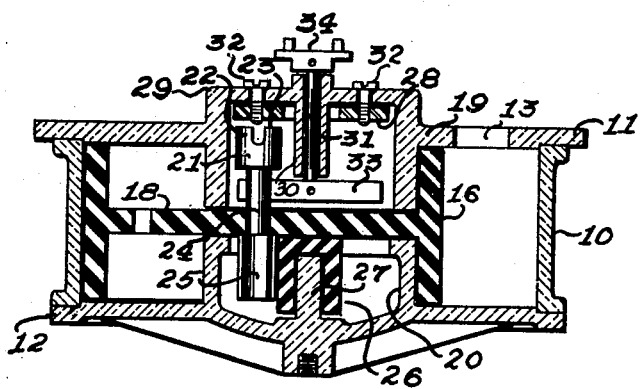
Figure 2 is a vertical section taken substantially on line 2—2 of Figure 1.

Referring in greater detail to Figures 1 and 2 of the drawings, the measuring chamber comprises a cylindrical body wall 10 having a top closure head 11 and a bottom closure head 12. One or both of the closure heads may be provided with a fluid inlet port 13 and an outlet port 14 between which the division or baffle plate 15 is vertically disposed and extends inwardly through a vertical slot indicated at 17 in the annular wall 16 of the oscillatory piston within the measuring chamber. The sectional form of this piston and the mounting and arrangement of plate 15 in cooperative relation therewith are preferably substantially the same as that shown in Whittaker Patent No. 2,338,152 granted January 4, 1944.

The oscillatory piston also includes a balancing perforated horizontal web 18, and the vertical dimension of the annular wall 16 of said piston is somewhat less than the distance between the opposing internal parallel faces of the heads 11 and 12 of the measuring chamber. These chamber heads are formed with the axially aligned hollow concentric bosses 19 and 20, respectively, positioned within the annular wall of the piston and having their opposed ends spaced apart for a distance slightly exceeding the thickness of the piston web 18. It will therefore be understood that in a vertical medial position of the oscillatory piston, the upper and lower edges of the annular wall 16 thereof have clearance relation to the internal faces of the heads 11 and 12, respectively, while the ends of the bosses 19 and 20 on said head are also in clearance relation to the upper and lower faces of the piston web 18.

My present improvement is concerned with means for overcoming the force of gravity acting on the piston by suitably suspending or sustaining the oscillatory piston in the measuring chamber in such medial position with respect to the associated stationary parts so that said piston will occupy an operative position of substantially floating equilibrium within the liquid contained in the measuring chamber and with the axis of said piston at all times perpendicular to the path of oscillation of the piston. To this end, in one embodiment of my invention, I provide a permanent magnet 21 which, in the present instance, is of general cylindrical form and provided with the spaced pole pieces 22 and 23, respectively. This magnet is suitably fixed to one end of a rod or stem 24, which in turn is fixed in the piston web 18 substantially at its axial center. Below said web, the rod 24 has a cylindrically enlarged portion 25 movable within the boss 20 on the bottom head 12 of the measuring chamber around a hard rubber sleeve 26 rotatably mounted on the axially centered stem 27 integrally formed with the head 12. The upper surface of this sleeve lies substantially in the plane of the upper end face of the boss 20. If desired stem 24 may be of non-magnetic material.

An armature is cooperatively associated with the magnet 21 and, as herein shown, is preferably in the form of a flat ring or annulus 28 of soft iron. This armature ring is positioned within an external prolongation 29 of boss 19 and surrounds the sleeve 30 extending downwardly therefrom which forms a bearing for a vertical shaft 31. The armature ring 28 is adjustable, to vary the air gap between the lower face of said ring and the magnet poles 22 and 23, by means of the adjusting screws 32 mounted in the external boss extension 29.

To the lower end of the vertical shaft 31 an arm 33 is suitably fixed, with which the rod 24 cooperates in the oscillating movement of the piston to rotate said shaft. To the upper end of the shaft 31 a member 34 is fixed and has driving connection with a gear train for a totalizing register (not shown). The register and gear train are mechanisms well known in the art and further description of the same herein is therefore not required.

It will be evident from the above description that in the oscillatory motion of the piston the magnet poles 22 and 23 are at all times in opposed relation to the lower face of the armature ring 28. By properly adjusting said armature ring, the magnetic flux forces are caused to sustain or suspend the piston through the rod connection 24 in a position of substantially balanced equilibrium within the fluid flowing through the measuring chamber and with the upper and lower piston surfaces in non-contacting clearance relation to the chamber heads 11 and 12 and the boss extensions 19 and 20 thereof. In other words, by means of my present invention, the resultant of the force of gravity due to the weight of the piston and the buoyant force of the displaced liquid is overcome by the oppositely directed lifting force of the magnet and armature combination so that free, continuous oscillatory motion of the piston unimpeded by mechanical frictional resistance will be obtained, even when the meter is operating under comparatively low fluid pressures.

The several parts of the measuring chamber are made of bronze or other material which will not have a de-magnetizing effect upon the magnet 21, while the piston and the sleeve 26 are preferably made of hard rubber.

Through the movement of the piston under the pressure of fluid flow through the chamber and guidance of the roller 25 about the sleeve 26, the magnet is constrained to move in a circular path coincident with and directly under the armature annulus. The magnetic attraction between the magnet and annulus is sufficient to substantially overcome the force of gravity on the piston and in combination with the buoyancy of the fluid being handled to sustain the piston intermediate its limits of vertical displacement, that is intermediate the parallel upper and lower surfaces of the measuring chamber and out of contact therewith. By maintaining the piston in such magnetically elevated position with its rim and web physically clear of contact with structure above and below the same, mechanical frictional resistance to its movement is materially reduced and gravitational drag substantially entirely eliminated. Furthermore, the noise incidental to the piston operation is correspondingly reduced.

In the embodiment of the invention shown in Figures 3 and 4, a second armature, in the form of an annular plate is mounted at the top of the chamber in magnetically coacting relation with a plurality of spaced magnets fixed to the circumferential wall of the piston and may advantageously be used to provide additional lift in meters and the like utilizing relatively large or heavy pistons. The invention illustrated in Figures 3 and 4 is substantially the same as in Figures 1 and 2 with the provision of added magnetic support for the piston, as will be described.

A flat annular plate member 36 of ferrous or other magnetic material is embedded in co-planar position in the non-magnetic top chamber head 11, as by casting or molding therein. Annulus 36 is sufficiently wide to be coextensive with all positions of piston wall 16, and is apertured at inlet and outlet ports 13 and 14, the inlet port aperture being illustrated in section in Figure 3 and the outlet port aperture (not shown) being the same. In the upper part of the cylindrical wall 16 of the piston are provided a plurality of equally spaced horseshoe magnets 37, in the form of approximately U-shaped elements fixed in suitable cavities in the wall with their circumferentially spaced pole pieces uppermost and their flat pole faces preferably substantially flush with and exposed through the top edge of non-magnetic wall 16. Magnets 37 are secured in any desired manner to wall 16, and if preferred may be molded or cast therein. While three magnets are illustrated, any desired number may be used.

As shown in the drawings, annular plate 36 has an external diameter closely approximating the external diameter of the chamber wall 10 and an inner diameter substantially corresponding to the outer diameter of the cylindrical wall boss 19 so as to extend over a horizontal area covering the complete area of movement of the piston carried magnets 37.

The magnet elements 37 are magnetically coupled to ring 36 and by reason of their even spacing circumferentially exert balanced lifting forces on the piston on which they are carried. Although the invention illustrated in Figures 3 and 4 shows ring 36 and peripheral magnets 37 as supplementing center magnet 21 and ring 28, it will be readily apparent that either of these magnetic suspension arrangements alone may be employed independently of or without the other, according to the purpose at hand.

The invention disclosed herein provides relatively simple and efficient means for suspending the fluid driven member in a position of vertical equilibrium, free from top and bottom contact with the walls of a measuring chamber or other casing. This reduces mechanical friction and renders operation of the meter more accurate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter having a measuring chamber, a piston adapted for movement in a substantially horizontal path within said chamber, and magnetically coupled means distributed circumferentially on said piston and said chamber for suspending said piston in balanced equilibrium for substantially frictionless movement in said path.

2. In the fluid meter defined in claim 1, wherein said chamber and piston have adjacent generally coextensive circumferential walls and said magnetically coupled means comprises a plurality of circumferentially spaced magnets on one of said walls and cooperating substantially coextensive armature means on the other of said walls.

3. In a fluid meter of the oscillating piston displacement type, a measuring chamber, an oscillatory piston within said chamber, a permanent magnet fixed to the piston approximately at its axial center, an annular armature member substantially concentric to the path of movement of the magnet with the oscillatory piston, means mounting the armature member on an upper wall of the measuring chamber, for positioning said armature member relative to the magnet poles, a plurality of spaced magnets distributed along the outer upper portion of said piston, and armature means on said upper wall of said measuring chamber above and coacting with said spaced magnets, whereby the weight of the piston is substantially compensated by magnetic forces and said piston sustained substantially in a position of floating equilibrium within the fluid medium, throughout its cycle of oscillatory motion.

4. In a rotary fluid meter having a measuring chamber, an oscillating piston in such chamber, and magnetic means in said meter exerting a sustaining force on said piston during its movement in said chamber comprising an upper wall on said chamber, an annular armature imbedded in said wall and disposed above the outer rim of said piston, and a plurality of circumferentially spaced magnets mounted on said piston rim below and coacting with said armature.

CHARLES P. BERGMAN.

REFERENCES CITED

The following references are of record in the file of this patent:

UNITED STATES PATENTS

| Number | Name | Date |
| --- | --- | --- |
| 75,313 | Stein | Mar. 10, 1868 |
| 796,067 | Duncan | Aug. 1, 1905 |
| 1,024,741 | Nash | Apr. 30, 1912 |
| 1,589,039 | Anschutz-Kaempfe | June 15, 1926 |
| 1,804,036 | Stevenson | May 5, 1931 |
| 2,207,274 | Smith | July 9, 1940 |
| 2,243,252 | Huxford et al. | May 27, 1941 |
| 2,254,698 | Hansen | Sept. 2, 1941 |
| 2,256,937 | Beams et al. | Sept. 23, 1941 |
| 2,315,408 | Hans | Mar. 30, 1943 |
| 2,389,125 | Barge | Nov. 20, 1945 |

FOREIGN PATENTS

| Number | Country | Date |
| --- | --- | --- |
| 539,409 | Great Britain | Sept. 9, 1941 |